(12) United States Patent
Broulik et al.

(10) Patent No.: US 6,323,881 B1
(45) Date of Patent: Nov. 27, 2001

(54) WEB BASED GUI SERVER AND METHOD FOR A TELECOMMUNICATIONS NODE

(75) Inventors: Hynek Broulik; Mihai Constantin, both of Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/177,609

(22) Filed: Oct. 23, 1998

(51) Int. Cl.[7] .................................................. G06F 3/00

(52) U.S. Cl. ........................ 345/744; 345/733; 345/762; 345/740; 345/760; 709/227; 709/311; 709/313

(58) Field of Search ..................................... 345/329, 333, 345/335, 733, 762, 744; 709/201, 203, 219, 227, 311, 313, 314

(56) References Cited

U.S. PATENT DOCUMENTS

| | | | |
|---|---|---|---|
| 5,848,246 | * | 9/2000 | Gish .................................. 709/203 X |
| 6,014,134 | * | 1/2000 | Bell et al. ............................. 345/329 |
| 6,014,702 | * | 1/2000 | King et al. ............................ 709/227 |
| 6,125,384 | * | 9/2000 | Brandt et al. ........................ 709/203 |

* cited by examiner

*Primary Examiner*—Raymond J. Bayerl
*Assistant Examiner*—X. L. Bautista

(57) ABSTRACT

A web based graphical user interface (GUY) server and method for a telecommunications node provides craft user interface capability with regard to remote login. The server is accessed using a PC resident browser thereby providing a standard GUI client that is both economical and in widespread use. A session manager ensures that all requests from a browser relating to a particular session are handled by the same task interface. Up to four concurrent sessions can be run on the telecommunications node. A proxy server provides the capability to access remote nodes via a local node.

9 Claims, 4 Drawing Sheets

WEB BASED GUI SERVER AND METHOD FOR A TELECOMMUNICATIONS NODE

FIELD OF THE INVENTION

The present invention relates to a web based graphical user interface (GUI) server and method for a telecommunications node and is particularly concerned with applications to craft user interfaces.

BACKGROUND TO THE INVENTION

In the telecommunications industry (switching, transport, and network management), the key requirements for the craft user interface (CUI) are a) fast, b) reliable, c) easy to use and d) connectivity. The user interface should be simple and easy to use. A simple interface helps to reduce procedural errors, outages, and is easy to learn. The information (the content and presentation) viewed at different nodes should be identical. Connectivity is the ability to access any node in a network via remote login procedures. For example, access to transport nodes from surveillance centers or from one node to another node via remote login.

In 1970s and 1980s, the craft user interface (CUI) has been based on command line languages (CLL) with the principal input/output (I/O) user device being either an actual or a simulated VT100 terminal. Connectivity using the command line languages (CLL), for interconnecting nodes has been provided by the widely used Telnet protocol.

In late 1980 and in early 1990s, the prevalent connectivity (CLL) interfaces have slowly been replaced by graphical user interfaces (GUIs) with the principal I/O device being a personal computer (PC) having a mouse, which is used as a selecting device. GUIs have been found to perform much better with regard to ease of use. They have been found to offer a superior UI and to be an economical solution for the telecommunications industry. However, there has been a problem with regard to connectivity between the nodes, since there has been no replacement for the Telnet (VT100 based) protocol.

FIG. 1 illustrates a known GUI implementation based on a client-server arrangement. A GUI client 10 typically resides on a PC 12 and is implemented with Visual C++ or Visual Basic. The GUI client 10 represents the GUI engine. A server 14 represents the execution engine. Communication between the client 10 and the server 14 is typically based on proprietary protocols 16. User Interface (UI) commands are interpreted by the GUI client 10 and communicated via a proprietary protocol 16 to a server 14 on a telecommunications node 20. The server 14 communicates with applications 19 via an API 21 to execute the UI commands and then returns results to the GUI client 10. The results are then rendered on the screen of the PC 12.

The known client-server systems have used a client having either a proprietary communications protocol or a Telecommunications Language-1 (TL-1) protocol. For the GUI client with a proprietary protocol, the GUI implementation improves the simplicity and usability of the UI. However, a C++ implementation (or Visual Basic or Java implementations) results in a large program (fat GUI) that requires time and resources to design and implement. Also, since the presentation of the GUI is platform dependent, it is difficult and expensive to achieve the same presentation on different platforms having different operating systems. The connectivity requirement of being able to remotely access any node in a network could only be solved by using proprietary protocols, and implementing such protocols on all nodes in a network. As can be appreciated, design and implementation of a this type of protocol is both expensive and time consuming. Often this alternative is not practical.

A fat GUI client with the TL-1 protocol GUI implementation is similar to the above except that the connectivity is provided by the TL-1 standard protocol. This protocol had been originally designed (in 1960) for machine-to-machine communication and is based on command line languages (CLL). Consequently, it is not well suited to communicating with a GUI and may become a bottleneck in the near future.

In addition to the above problems, both the client and server software must be of the same version. Since the GUI client is developed for a PC and is distributed on diskettes (or CDs), the version of the diskette should match the version of the main software (i.e. the server) on a telecommunications node. To maintain compatibility between the client and server in the field is logistically very difficult and expensive. In practice this could lead to version control problems and the possibility of mistakes or dysfunctional UI, if the versions do not match.

Another problem with this client/server approach is each telecommunications product would require its own design and implementation of the GUI client. Consequently, the design and implementation would be expensive. Also, the user must have several GUI clients on their PC, that is one for each different product. In practice it would be difficult from both operation and maintenance points of view. The user would have to switch between different GUI clients, and would have to maintain several different GUI clients. GUI version control issues could easily lead to a situation becoming unmanageable. Clearly these problems would not be acceptable for telecommunications providers. Another problem with GUI clients that are platform dependent is cost. Each platform, e.g. PC Windows 95, Windows NT (trademarks of Microsoft Corporation), Unix (trademark of AT&T) would require a new implementation of the GUI. The overall design would be the same, but parts of the GUI client would have to be redesigned and implemented. Since, in reality, telecommunications providers are using different platforms, the telecommunications equipment vendors would have to support all platforms.

An additional problem with platform dependent GUI clients are differences in presentation. Each platform has its own way to present graphical elements. As a result, if a craft person has a PC which has a different platform than that used in the surveillance center (usually Unix engine), the presentation of the same information will be slightly different. Such differences could lead to errors in operation that would not be acceptable by telecommunications providers.

A further problem is GUI clients do not support remote logins. The ability to connect (to login) to another node, thereby performing a remote login, is a basic requirement of the craft user interface (CUI). With the GUI client-server paradigm, this requirement is very difficult to satisfy. Theoretically it is possible to develop proprietary protocols (or use the old TL-1 protocol), but in practice such solutions would be very expensive and very difficult to maintain. This would mean that GUI clients would have to be able to interpret commands of all products, leading to very large GUI clients with nearly impossible version control requirements (i.e. they would have to be in sync with many products).

SUMMARY OF INVENTION

An object of the present invention is to provide and improved web based GUI server and method for a telecommunications node.

According to an aspect of the present invention, there is provided a web based GUI architecture for telecommunications node that is an economical and uniform solution and that enables a common GUI on all nodes in a network, uniform access to all nodes in a network via common standard protocols, economical UI development for telecommunications vendors, and an economical solution for telecommunications providers by way of saving of craft training.

In accordance with another aspect of the present invention there is provided apparatus for a web based graphical user interface (GUI) server for a telecommunications node comprising a module for creating a predetermined number of interface tasks at initialization and a session manager for establishing a session and associating one of the predetermined number of interface tasks with the session.

In accordance with a further aspect of the present invention there is provided a method of providing a web based graphical user interface (GUI) to a telecommunications node comprising the steps of creating a predetermined number of interface tasks at initialization, establishing a session and associating one of the predetermined number of interface tasks with the session.

BRIEF DESCRIPTION OF THE DRAWINGS

The present invention will be further understood from the following detailed description, with reference to the drawings in which.

DETAILED DESCRIPTION

Figure 1:
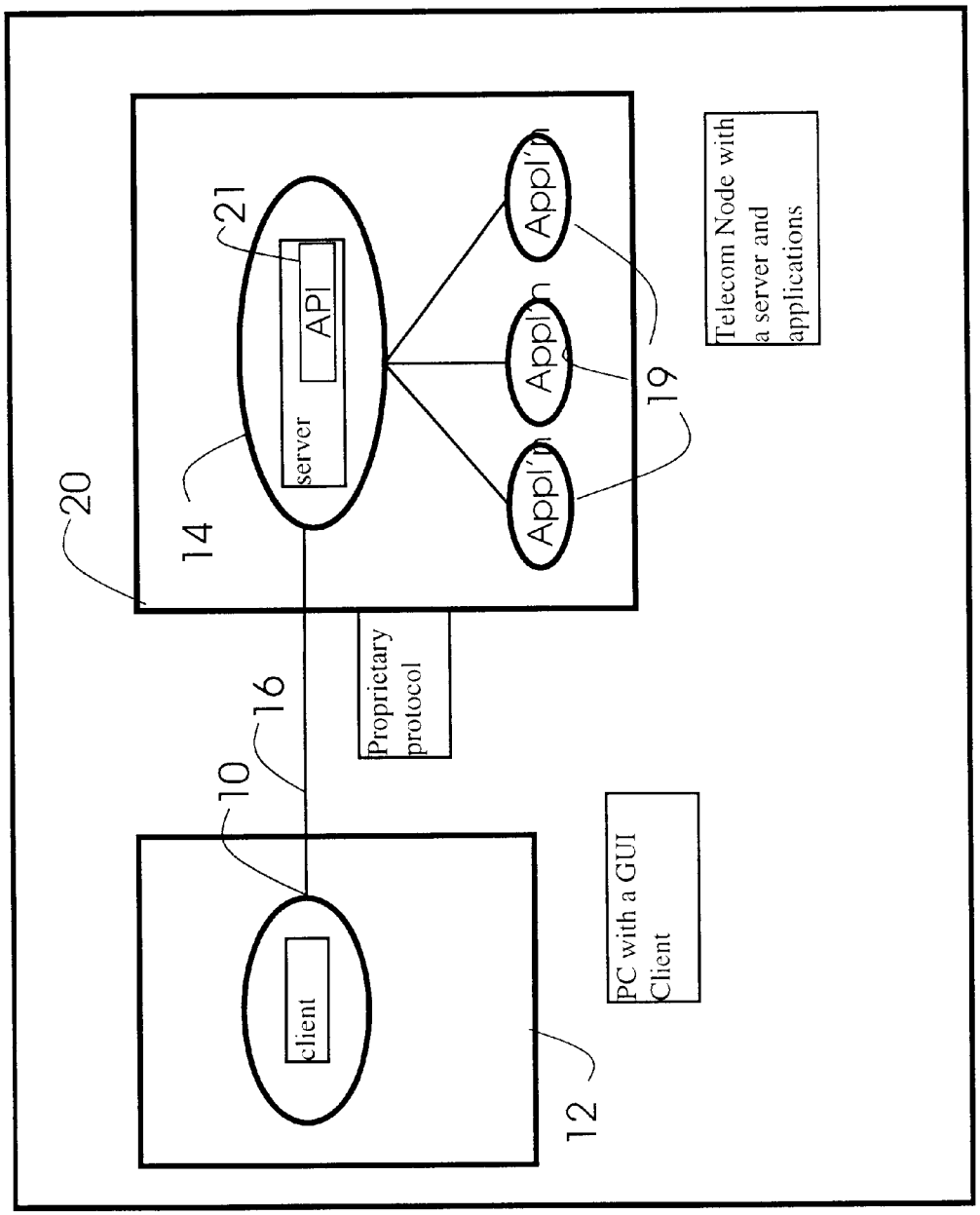
FIG. 1 illustrates a known GUI implementation based on a client-server arrangement.
Figure 2:
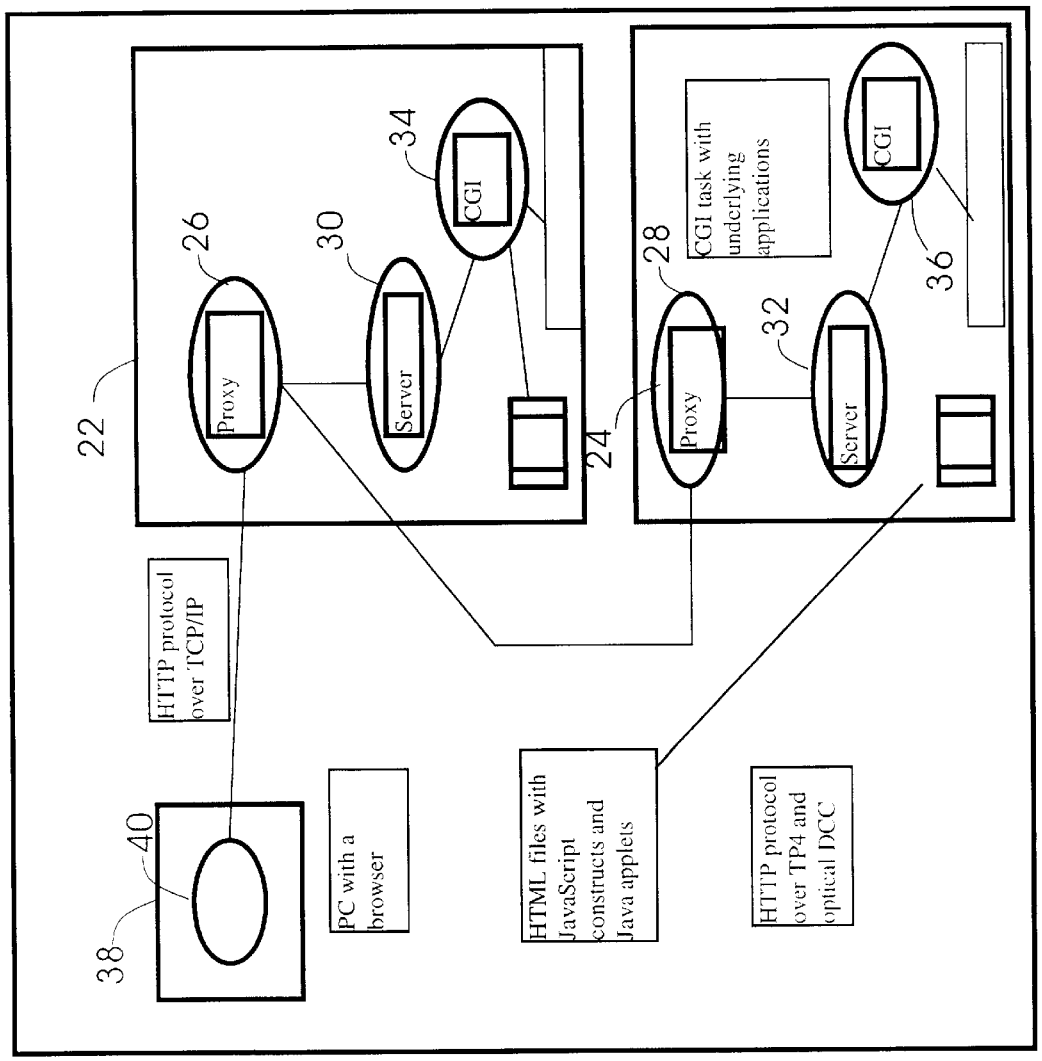
FIG. 2 illustrates in a block diagram a web based GUI server for a telecommunications node in accordance with an embodiment of the present invention.

Referring to FIG. 2, there is illustrated, in a block diagram, a web based GUI server for a telecommunications node in accordance with an embodiment of the present invention. The architecture includes within telecommunications nodes 22 and 24, proxies 26 and 28, respectively, servers 30 and 32, respectively and CGI tasks 34 and 36, respectively. A personal computer (PC) 38 includes a client (browser) 40 and communicates with the telecommunications node 22.

A web based GUI works on the client-server paradigm, but both the client and the server are based on (industry) standard programs, platform independent, communicating via (industry) standard protocols TCP/IP and HTTP.

In web terminology, the client is called a browser. The browser is a platform independent GUI engine that accepts and interprets standard data formatting descriptions (HTML), standard script language constructs (JavaScript) and standard Java written small programs (applets). The present embodiment takes advantage of the widespread availability of browsers to provide the client portion of its web based GUI architecture.

The server is called an HTTP daemon or just an HTTP server. The HTTP server is platform independent due to wide acceptance of the HTTP protocol. The HTTP server receives requests from browsers one at a time. The HTTP server is supported by common gateway interface (CGI) tasks (programs). Requests accepted by the server are passed to CGI tasks for execution/processing. The CGI tasks then return the results to the browsers. The browser provides the GUI framework, while the actual CUI resides on the telecommunications node as a set of HTML files (with Java Script constructs), XML files, CGI tasks and Java applets.

The standard protocols used between the browsers and servers are capable of communicating GUI to remote nodes and can perform a similar function to GUI as the Telnet protocol provides for command line languages (CLL). However, in order to achieve the remote login capability needed for the craft user interface in accordance with the present embodiment, additional elements are required. A server proxy 26, 28 and an address service (not shown in FIG. 2) are added to provide remote login capability. The proxy server 26, 28 acts as a relay enabling a browser 40 to connect to a remote node 24 via access to a local node 22. This is called a remote login. The browser 40 connects to a local node proxy 26, and the proxy 26 with the help of the address service locates the remote HTTP server 32 and relays the browser's requests to it.

In operation, the browser 40 on a PC 38 sends a request to a locally connected telecommunications node 22. The connection is either physical (through RS232 port) or through a LAN (through Ethernet port). First, a request is accepted by the proxy server 26. The request can be either navigation (i.e., move to next menu level) or a command (e.g., list all alarms) or the very first request—the login request. The protocols used between the browser 40 and the proxy 26 are HTTP over TCP/IP.

The proxy server 26 accepts the request and determines its destination. If it is a local request, then the proxy 26 passes the requests to the local server 30. The protocols used are the same, i.e., HTTP over TCP/IP. If it is a request for a remote node 24, the proxy 26 determines the remote node destination, converts the TCP/IP protocol into TP4 protocol and sends the request to the proxy 28 on the remote node 24. The protocols are now HTTP over TP4. The physical connection can be either LAN (Ethernet) if the nodes are connected on the same LAN backbone or optical if the nodes are connected through SONET optical data communications channels (DCC). Note, that for the access, Department of Defense (DOD) protocol stack (TCP/IP) is being used and for the internal routing through SONET DCC an ISO seven layer protocol (TP4) is being used. Both protocols are connection-oriented protocols.

Figure 3:
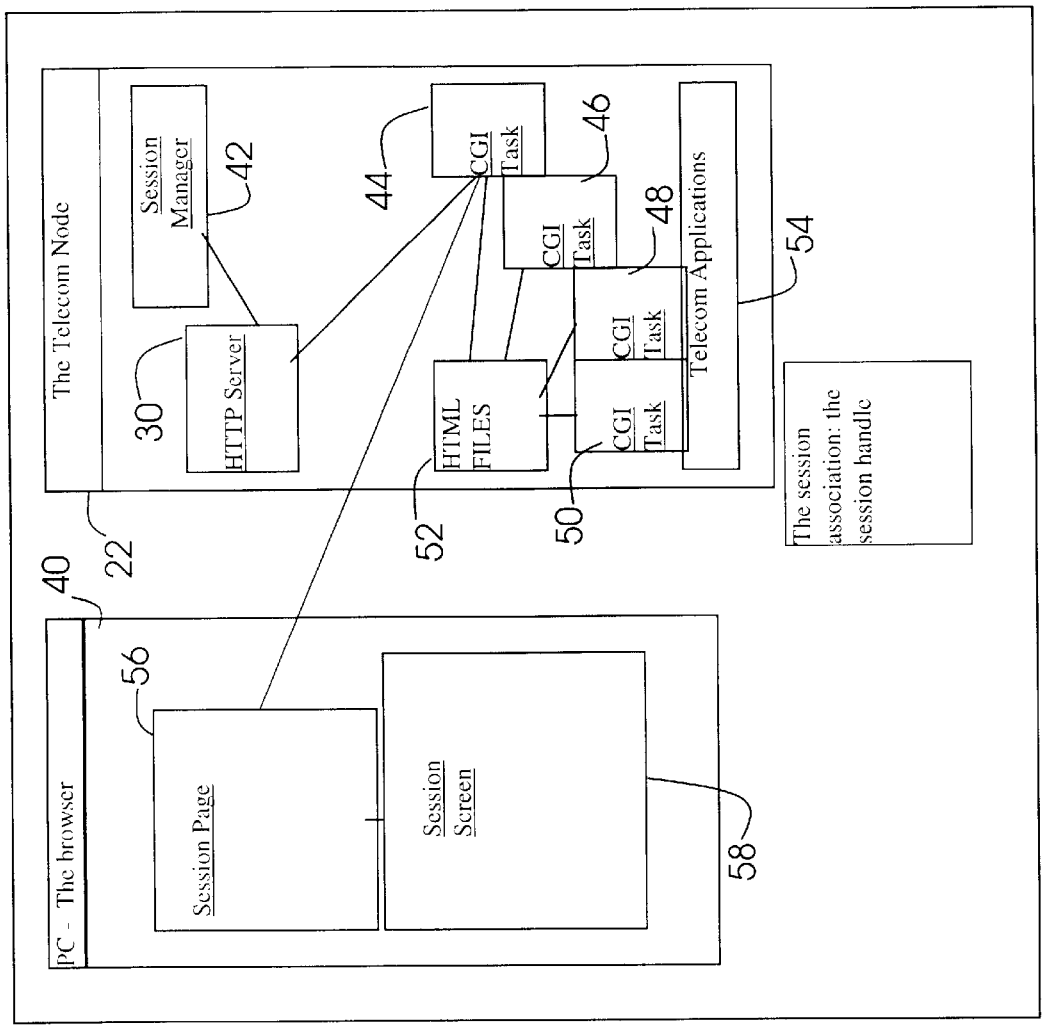
FIG. 3 illustrates in a functional block diagram a session task structure used in the architecture of FIG. 2 in accordance with an embodiment of the present invention.

Referring to FIG. 3 there is illustrated, in a functional block diagram, a session task structure used in the architecture of FIG. 2 in accordance with an embodiment of the present invention. In addition to the proxy 26, the web based GUI requires a way to define all requisitions that constitute a session. For this purpose a session manager 42 and four CGI tasks 44, 46, 48, 50 are provided. The server 30 gets the request from browser 40 and determines which session is associated with the request. If the request is not associated with any previous requests, it is a first request of a session. The first request is a login request that causes a session to be created. For the login request, the server 30 creates a session. There are four CGI tasks 44, 46, 48 and 50 pre-created at the time of initialization and waiting in the 'suspend' mode. This is done for the real-time and memory requirements as it would be too slow if the server were creating the CGI tasks at the time of login. The CGI task should be waiting and all required memory should be pre-allocated once the system is initialized. The server 30 selects the first waiting CGI task 44 and requests a special numeric tag, a session handle from a session manager 42. This session handle then serves as an association between all browser's requests (transactions) and this particular CGI task 44, thereby forming a session task. When creating a session, the session CGI task 44 checks all the requirements for a secure connection (authentication, validity of a password, etc). The session CGI task request queue is then initialized and activated. The task has a request queue with the maximum number of two requests at a time. The depth of the request queue is important for the robustness of the operations. Once, the session initialization is done, the session CGI task 44 is ready for routine processing.

If the request is a command or navigation, the server 30 finds the appropriate session CGI task 44 and passes the requests to it. The request has been changed by a server 30 from an HTTP request into a CGI request.

When the CGI task 44 gets the request, it first determines if the request is a navigation or a command request. If it is navigation request, i.e., the user wants to move to different menu on the screen. The CGI task 44 retrieves a template for the new menu. The template is actually an HTML file, the CGI task 44 sends the template back through the server 30 (or the proxy 28 if the request came from a remote browser) to the originating browser 40. This completes the request and the user can now issue another transaction.

If the request is a command, i.e., user wants to perform some action such as listing all alarms, the CGI task 44 converts the CGI request into appropriate application call, to telecom applications 54 and gets the application reply data. The reply data are then converted into an HTML file and send back through the server 30 (or the proxy 28 if the request came from a remote browser) to the originating browser 40. This completes the request and the user can now issue another transaction.

If the request is a command, i.e. user wants to perform some action such as listing all alarms, the CGI task 44 converts the CGI request into appropriate application call, to telecom applications 54 and gets the application reply data. The reply data are then converted into an HTML file and sent back through the server 30 (or the proxy 28 if the request came from a remote browser) to the originating browser 40. This completes the request and the user can now issue another transaction.

In order to provide a craft user interface based on a web GUI, synchronization of current session states on a telecommunications node and a browser must be provided. Current HTTP protocol and servers are stateless, that is, the servers process one request at a time and they do not rely on previous requests. For the CUI session, however, the context is an important aspect of operation. The browser 40 and the telecommunications node 22 or 24 need to have a memory of what session the current page/window is associated with and as well the state of a particular session. The association of a session with the page is described herein below in regard to the session management. The context sensitivity, i.e., how the state of a current session on the browser and the Telecommunications node is synchronized is described here.

Context sensitivity is a feature of the present embodiment of the invention. Context sensitivity means, that any time the user interacts with the telecommunications node 22, he/she can operate and get information only on the current configuration of the node 22. For example, before the node 22 is commissioned, only a certain subset of the CUI is available to the user. Or, for example, if a card is removed from the node 22, the CUI immediately recognizes the change and does not allow any operation on the missing card. The context sensitivity is programmed at two places.

First, the CGI task 44–50 interacts with the node's applications 54 and gets notifications about configuration changes. Second, the changes are communicated to a JavaScript construct on the browser 40 and reflected in the variables of session page 56.

Note: When the session is created, the first HTML file contains global variables and JavaScript routines. The variables are set to reflect the configuration state of the telecommunications node 22 at the login time. Any configuration (context) changes are immediately communicated to the JavaScript routines via HTTP protocol and the global session variables are changed appropriately. This way, the telecommunications node software and the browser session page 56 are always in synchronization.

In the telecommunications CUI, certain information rendered on the screen is dynamic in nature, i.e. changing in the real time. There is a need to display the change immediately when the telecommunications node changes the value of the information.

In the CUI, a typical example is a banner line, i.e., a line with several fields that are changing in real-time. The fields are for example critical and/or major alarms, and number of protection switches.

Another example is protection screens. When protection information is displayed in the output screen area, the information on the screen is updated in real-time.

Web based GUI in accordance with the present embodiment provides for both banner line and dynamic screens in the output screen area. The dynamic (or real-time) updating is implemented at two places. First, the CGI task 44–50 is notified about the change by telecommunications node's applications 54. Then, these changes are pushed to the browser's session page 56, processed by the JavaScript constructs and then modified in the appropriate screen area.

The change may be high-lighted for example by changing a color of the changed field. The banner line is placed above the menu and output area. There may be several banner lines, a local banner line, and a network banner line.

Because current HTTP protocol and servers are stateless, that is, the servers process one request at a time, they do not remember previous requests. For the CUI session, however, the context is an important aspect of operation as described above. The browser 40 and the telecommunications node 22 or 24 need to have a memory of what session the current page/window is associated with and as well the state of a particular session.

This means that all request originated by a browser 40 should be associated with a certain session and all replies received by a browser 40 should be displayed in the appropriate browser window 58. One browser 40 can run several (max. 4) sessions simultaneously, i.e., a one to one association between the browser window and the session on the telecommunications node.

In known web technology, with the stateless paradigm, the server creates a CGI task to process a request and the CGI task then terminates when its processing is completed. In the HTTP protocol, there is the concept of a "cookie", to maintain an association between one request and one reply. The cookie could be used for the session/window association, but it is not a sufficient solution. The problems associated with the use of a cookie are as follows: the creation and termination of tasks in real-time systems consumes CPU and memory resources; the paradigm allows a user to create a number of concurrent requests; each one resulting in a creation of new CGI tasks, i.e. burst of requests can cause a resource crisis in the real time systems; and some requests may have longer processing time and if the user creates other requests, the previous requests should be aborted—i.e., there needs to be a certain level of serialization otherwise resources could be depleted very quickly.

In accordance with an embodiment of the present invention, four CGI tasks 44–50 are created at the system startup and then suspended. The four CGI tasks 44–50 will be in the suspended state. When the server 30 gets login requests, it first acquires a free (suspended) CGI task 44 (46, 48, or 50) and activates it. The CGI task is then associated with this session. At anytime, the number of sessions is limited to four, i.e. the number of CGI tasks that exist. This is done to manage the resources of the system that are required for a session. A special numeric tag, the session handle, is used to establish an association between the window and the session. This allows the server to recognize that the requests should go to the appropriate CGI task. The handle is never repeated, for a new session, there is always a new instance of a handle.

To provide the serialization and aborting of requests, each CGI task has a queue of only two requests, labeled 'new' and 'current'. The CGI task can work on one request at a time. When the new request arrives, the server 30 always places the new request into the queue called 'new'. This allows the CGI task to discard excessive requests from the browser. The CGI task takes the request from the queue named 'new', moves the request into the queue named 'current', clears the 'new' queue and starts processing the current request. When the processing is completed, the CGI task checks the queue named 'new' before returning the results of the current request. If the queue 'new' contains a request, the CGI task discards the results, and starts processing this new request as described above. This allows the CGI task to abort a command that has been superseded Session task structure and functions shown in FIG. 3 includes and a HTTP server 30, a session manager 42, CGI tasks 44–50, a session page 56 and session security (not shown in FIG. 3). HTTP Server 30 has been modified from the standard HTTP server. Instead of creating new CGI tasks, the server communicates with a session manager to find an appropriate existing CGI task. The method of passing CGI requests has been modified accordingly. The session manager 42 keeps track of the state of CGI tasks 44–50. The session manager 42 also generates the session handles and assigns them to a session.

The CGI task represents a session on the telecommunications node. The CGI tasks are created at the system startup and then suspended. Each CGI task 44–50 is activated for the duration of a session, by a session manager 42. When the session is terminated, the CGI task is once again suspended.

The session page 56 represents the session on the client 40 (the browser). The session page 56 is an HTML file with JavaScript constructs and is downloaded by the browser 40 during the login procedure. The session page contains all global variables and routines for the session. The session page processes the session handle and attaches the session handle to each request originated by the associated session.

Session security has the following aspects: authentication, automatic logout, and intrusion protection. Authentication is provided for by requiring the user logging in to enter a USERID and a password. Verification is done by the session manager when the session is being created. The CGI task monitors session inactivity. If the session is not active for a predetermined period of time, for example 30 minutes, the CGI task suspends itself and informs the session manager. The session handle is invalidated, i.e., any request coming from the browser with this session handle will be refused with a message stating that the session is not active.

The session manager counts the number of invalid login attempts and stores information about invalid login attempts in the log and provides the information in a welcome message for valid login. This is to inform about possible intrusion attempts. After a predetermined number of attempts, for example 3 invalid login attempts, the session manager does not accept any further login attempt for a predetermined period of time, for example 30 seconds. This acts as a defense against machine generated login attempts.

Connectivity, that is, ability to remote login from one telecommunications node to another telecommunications node is a basic requirement of the craft user interface (CUI). The web based GUI of the present embodiment consists of the following components that facilitate connectivity: proxy server and address service. The proxy server works as a relay and as a protocol converter. Each node, in order to support the web based GUI, has a proxy server. The proxy server operates on requests. Requests conform to the HTTP protocol. The proxy determines the destination of a request and relays the request to the proper node for example from node 22 to node 24. If the request is destined to the local node 22, then the request is passed to the HTTP server 30. The proxy server 26 converts the protocols as described herein below.

The address service (not shown in FIGS. 2 and 3) maintains the address space, that is the addresses and names of the telecommunications nodes that are using a OSI protocol address service. Each node has a (Network) Service Access Point (NSAP). The NSAPs are reused by the proxy server for addressing telecommunications nodes.

Connectivity between web based GUI and legacy CLL UIs (for example VT100 based UI) are maintained by the present embodiment. The connectivity, that is, the remote login to the nodes, which do not support web based GUI, is done through the Telnet protocol. Telnet protocol works on the client/server principle. The Telnet client is implemented as a task running with the session CGI task. The Telnet client is invoked through the "remote login" command from the browser 40 and the CGI task processing the command, connects the Telnet client with the browser; output from the Telnet client is then emulated in the browser window. This allows the telnet session to be run from inside the web based GUI.

The main protocol, HTTP protocol, is not converted. The lower protocol, TCP/IP and TP4 protocols are converted, depending on the destination and origination of the request. The basic rule is: traffic on SONET DCC channels is carried by TP4 and traffic on Ethernet connections are carried by TCP/IP. The protocol conversion, the fact that we are running HTTP protocol over the TP4 protocol, is a significant feature of the present embodiment.

The web based GUI of the present embodiment makes use of the browser 40, as the framework for the GUI implementation. The browser 40 gets HTML files 52 (and possible XML files) with JavaScript constructs and/or Java applets from the server 30, that is, from the telecommunications node 22. This set of HTML files 52 (and XML files, JavaScript and Java applets) reside on the telecommunications node 22. These files define the craft UI, hence replacing the set results in a different craft UI, without changing anything else on the telecommunications node 22.

This feature of the embodiment of the present invention allows customization of user interfaces by replacing the set of HTML files. User interfaces can be implemented in other natural languages by replacing the set of HTML files with new HTML files of the desired language.

Since the HTML files 52 reside on the telecommunications node 22 with the main software, there is no need to have a separate implementation on a PC. Consequently, any browser from any platform (Mac, PC, Unix) will get the same rendering of the GUI. Distribution of software is not a problem, since the UI is distributed together with the main software on the telecommunications node.

Main building blocks for the web based GUI are buttons, forms, tables, list, selections and hypertext links. The browser 40 interprets these HTML/Java/JavaScript elements. Additional building blocks include maps, style sheets, graphics and XML elements.

Using the browser 40 and its capabilities allows for a common look and feel of user interfaces across different telecommunications products, from the top managing nodes to the bottom managed nodes.

Figure 4:
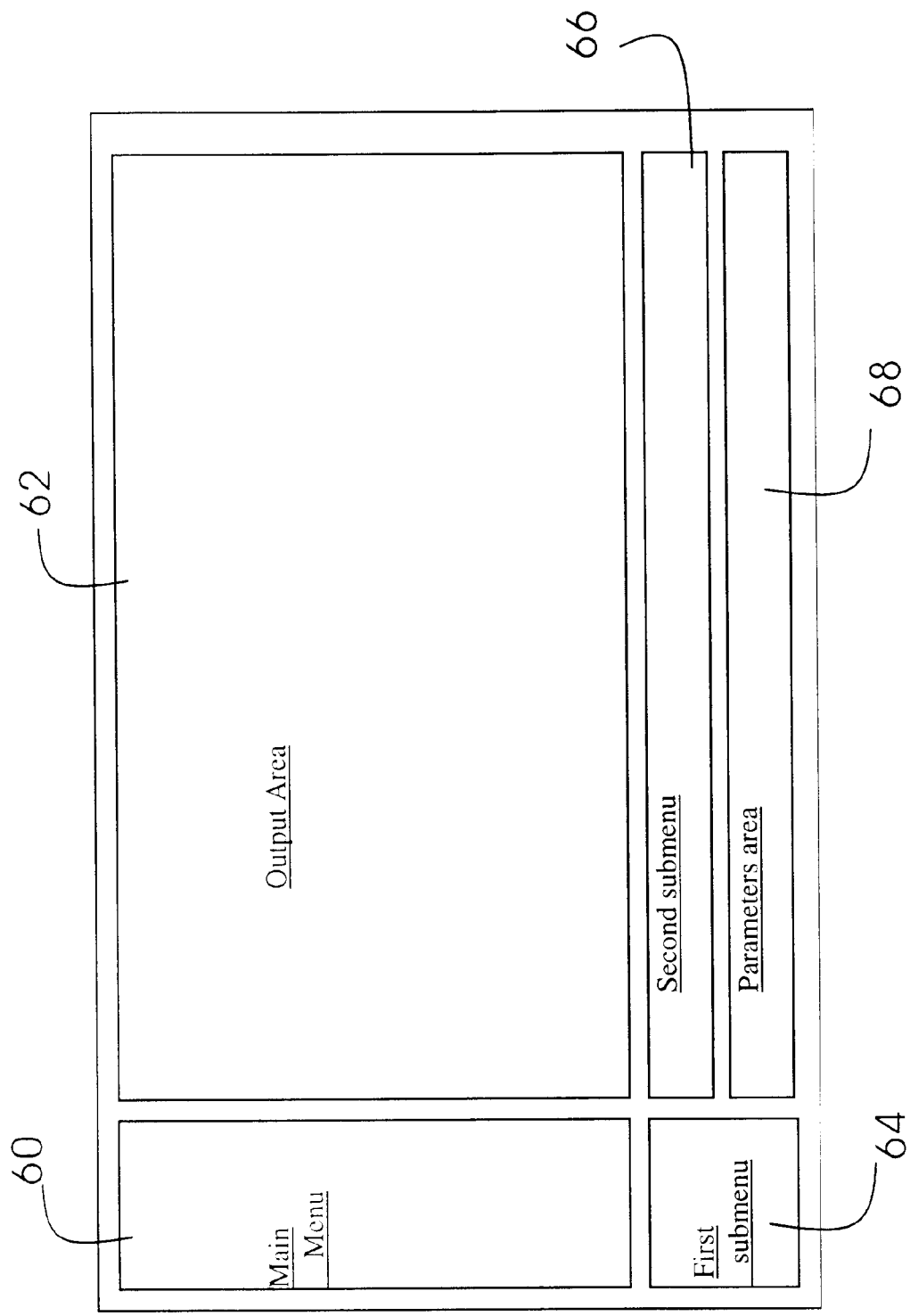
FIG. 4 illustrates, in a block representation, a GUI screen for the embodiment of FIG. 3.

Referring to FIG. 4 there is illustrated, in a block representation, a GUI screen for the embodiment of FIG. 3. The screen includes a main menu 60, and output area 62, a first submenu 64, a second submenu 66 and a parameters area 68. The screen layout for the client 40 has been designed to provide immediate user feedback. The users should see the immediate context of their interaction with the telecommunications node 22. They should see on the session screen 58, what command has been issued, what the current state of the command execution is, and what options have been used with the current command. This design intent is achieved by dividing the screen into several hierarchical areas: main menu area, first submenu area, second submenu area, parameters area and output area. Each area displays immediate identification of the command executed in its first line.

The screen layout, positioning of all its elements and color coding is the same for all commands.

The point and click user interface is optimized for response time. For each command, the screen layout is designed to minimize the number of clicks needed for a command. The definition of the screen layout is done by means of HTML frames. When the session is created during a login procedure, the first downloaded HTML file contains the frame definition, i.e. the screen layout.

On-line help is an important feature of GUIs. The present embodiment may include on-line help. The on-line help is based on the HTML (help) files containing detailed descriptions of commands. Since the on-line help information can grow into large sized files (hundred of kilobytes) some compression techniques are necessary. The design of the decompression of the help files is based on the concept of the session page. The first HTML file downloaded by the browser during the login procedure contains decompression routines, i.e., all HTML help files will be decompressed on the client (browser) side.

The present embodiment of the invention has the advantage of using a server (browser) that is economical. Using the browser as the GUI engine brings advantages for the user. All browser capabilities can be applied to the UI, for example, the users can print a page, search pages of output for certain strings, file the pages as a file into his/her directories, and mail a page.

Acronyms

API Application Programming Interface

CGI Common Gateway Interface

CLL Command Line Language

DCC Data Communication Channel

DOD Department Of Defense

DWDM Dense Wave Division Multiplexing

GUI Graphical User Interface

HTML hypertext Markup Language

HTTP Hypertext Transmission Protocol

JavaScript Script programming language supported by browsers

Java Programming language

OSI Open System Interconnect protocols

SONET Synchronous Optical Networks

XML Extended Markup Language

TCP/IP Transmission Control Protocol/Internet protocol

Telnet Application enabling remote logins

TP4 Transmission Protocol—layer 4

What is claimed is:

1. A web based graphical user interface (GUI) server for a telecommunications node comprising:

a module for creating a predetermined number of interface tasks at initialization; and a session manger for establishing a session and associating and activating one of the predetermined number of interface tasks with the session; the session manager maintaining a plurality of types of session handle for tagging requests from a browser communicating with the telecommunications node, wherein a particular type of session handle is assigned to all requests associated with a particular session, wherein the plurality of types of session handle is the same as the predetermined number of interface tasks.

2. A web based GUI server as claimed in claim 1 wherein the predetermined number is four.

3. A web based graphical user interface (GUI) server for a telecommunications node comprising:

a module for creating a predetermined number of interface tasks at initialization; and a session manager for establishing a session and associating and activating one of the predetermined number of interface tasks with the session wherein the interface tasks are common gateway interface (CGI) tasks wherein each interface task includes a plurality of queues for storing requests.

4. A web based GUI server as claimed in claim 3 wherein the plurality is two and one queue is for storing a current request and the other is for storing a new request.

5. A method of providing a web based graphical user interface (GUI) to a telecommunications node comprising the steps of:

creating a predetermined number of interface tasks at initialization;

establishing a session; and associating one of the predetermined number of interface tasks with the session and maintaining a plurality of types of session handle for tagging requests from a browser communicating with the telecommunications node, wherein the plurality of types of session handle is the same as the predetermined number of interface tasks.

6. A method of providing a web based GUI as claimed in claim 5 wherein the step of associating occurs on receipt of a request from a browser communicating with the telecommunications node.

7. A method of providing a web based GUT as claimed in claim 5 wherein the step of associating includes the step of assigning a particular type of session handle to all requests associated with a particular session.

8. A method of providing a web based GUI as claimed in claim 5 wherein the predetermined number is four.

9. A method of providing a web based GUI as claimed in claim 5 wherein the interface tasks are common gateway interface (CGI) tasks.

\* \* \* \* \*

UNITED STATES PATENT AND TRADEMARK OFFICE
CERTIFICATE OF CORRECTION

PATENT NO.    : 6,323,881 B1
DATED         : November 27, 2001
INVENTOR(S)   : Hynek Broulik and Mihai Constantin It is certified that error appears in the above-identified patent and that said Letters Patent is hereby corrected as shown below:

Title page,
Item [57], ABSTRACT,
Line 1, "(GUY)" should be -- (GUI) --

Column 2,
Lines 32 to 41, commencing with "Another problem with GUI agents…" should be a separate paragraph.

Column 10,
Line 55, "GUT" should be -- GUI --

Signed and Sealed this

Twenty-eighth Day of January, 2003

JAMES E. ROGAN
*Director of the United States Patent and Trademark Office*